(12) United States Patent
Kanzawa

(10) Patent No.: US 10,576,984 B2
(45) Date of Patent: Mar. 3, 2020

(54) SECOND STOP POSITION FOR INTERSECTION TURN

(71) Applicant: Toyota Research Institute, Inc., Los Altos, CA (US)

(72) Inventor: Yusuke Kanzawa, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 258 days.

(21) Appl. No.: 15/642,886

(22) Filed: Jul. 6, 2017

(65) Prior Publication Data

US 2019/0009782 A1 Jan. 10, 2019

(51) Int. Cl.
*B60W 30/18* (2012.01)
*G05D 1/02* (2006.01)
*G08G 1/16* (2006.01)

(52) U.S. Cl.
CPC .......... *B60W 30/18154* (2013.01); *B60W 30/18109* (2013.01); *G05D 1/0223* (2013.01); *G08G 1/166* (2013.01); *B60W 2400/00* (2013.01); *B60W 2550/14* (2013.01); *B60W 2550/22* (2013.01); *B60W 2720/10* (2013.01); *B60W 2720/24* (2013.01); *G05D 1/0231* (2013.01); *G05D 1/0257* (2013.01); *G05D 2201/0213* (2013.01)

(58) Field of Classification Search
CPC ..... B60W 30/18154; B60W 30/18109; B60W 2550/22; B60W 2550/14; B60W 2400/00; B60W 2720/10; B60W 2720/24; G05D 1/0223; G05D 1/0231; G05D 2201/0213; G05D 1/0257; G08G 1/166
See application file for complete search history.

(56) References Cited

U.S. PATENT DOCUMENTS

| 8,126,642 | B2 | 2/2012 | Trepagnier et al. |
| 8,527,199 | B1* | 9/2013 | Burnette ............... G01C 21/32 701/23 |
| 9,910,443 | B1* | 3/2018 | Lee ....................... B60W 10/06 |
| 9,953,527 | B1* | 4/2018 | Alhazmi .................. G08G 1/08 |
| 10,133,275 | B1* | 11/2018 | Kobilarov ............ G05D 1/0055 |
| 10,241,508 | B2* | 3/2019 | Fairfield .............. G05D 1/0044 |
| 10,429,846 | B2* | 10/2019 | Nix ....................... B60W 50/08 |

(Continued)

OTHER PUBLICATIONS

Reece et al., "A computational model of driving for autonomous vehicles", Carnegie Mellon University Research Showcase, Pittsburgh, PA,1991 in 47 pages.

(Continued)

*Primary Examiner* — Mussa A Shaawat
(74) *Attorney, Agent, or Firm* — Christopher G. Darrow; Darrow Mustafa PC

(57) ABSTRACT

This disclosure describes various embodiments for determining a second stop position for an intersection turn by an autonomous vehicle. In an embodiment an autonomous control module is described. The autonomous control module may comprise a memory and a processor coupled to the memory. The processor may be configured to determine a first stop location at an intersection; cause a vehicle to stop at the first stop location; determine a turn path through the intersection; determine a second stop location along the turn path; cause the vehicle to advance to the second stop location; cause the vehicle to stop at the second stop location; and cause the vehicle to continue along the turn path.

12 Claims, 8 Drawing Sheets

(56) References Cited

U.S. PATENT DOCUMENTS

| | | |
|---|---|---|
| 2013/0304279 A1 | 11/2013 | Mudalige et al. |
| 2014/0136414 A1 | 5/2014 | Abhyanker |
| 2016/0161270 A1* | 6/2016 | Okumura ............... G01C 21/34 701/23 |
| 2017/0124869 A1* | 5/2017 | Popple ............. G08G 1/096725 |
| 2017/0200330 A1* | 7/2017 | Gupta .................... G07C 5/085 |
| 2017/0262709 A1* | 9/2017 | Wellington ........ G06K 9/00791 |
| 2017/0277181 A1* | 9/2017 | Fairfield .............. G05D 1/0044 |
| 2018/0150081 A1* | 5/2018 | Gross ................. G01C 21/3446 |
| 2018/0276912 A1* | 9/2018 | Zhou .................... G07C 5/0808 |
| 2018/0374347 A1* | 12/2018 | Silver .................. G08G 1/0965 |

OTHER PUBLICATIONS

Y. Gu et al., "Human-like motion planning model for driving in signalized intersections", IATSS Research (2016) in 11 pages.

Le Vine, S. et al. "The tension between autonomous cars' impacts on intersection level-of-service and their occupants' use of travel time for leisurely or economically productive activities". Presented at the 94th Annual Meeting of the Transportation Research Board, Jan. 11-15, 2015. Washington, D.C. in 27 pages.

* cited by examiner

SECOND STOP POSITION FOR INTERSECTION TURN

TECHNICAL FIELD

The subject matter described herein relates in general to autonomous vehicle control, and more particularly, to a second stop position for intersection turns.

BACKGROUND

Autonomous vehicles are controlled by a control system rather than a human driver. Sometimes the human driver identifies a desired destination to the autonomous vehicle and the autonomous vehicle uses a control system to drive to the desired destination.

SUMMARY

This disclosure describes various embodiments for determining a second stop position for an intersection turn by an autonomous vehicle. In an embodiment an autonomous control module is described. The autonomous control module may comprise a memory and a processor coupled to the memory. The processor may be configured to determine a first stop location at an intersection; cause a vehicle to stop at the first stop location; determine a turn path through the intersection; determine a second stop location along the turn path; cause the vehicle to advance to the second stop location; cause the vehicle to stop at the second stop location; and cause the vehicle to continue along the turn path.

In another embodiment, a vehicle is described. The vehicle may comprise one or more sensors, a wireless communication system, and an autonomous control module coupled to the one or more sensors and the wireless communication system. The autonomous control module may be configured to determine a first stop location at an intersection; cause the vehicle to stop at the first stop location; determine a turn path through the intersection; determine a second stop location along the turn path; cause the vehicle to advance to the second stop location; cause the vehicle to stop at the second stop location; and cause the vehicle to continue along the turn path.

In another embodiment, a method for an autonomous intersection turn in an autonomous vehicle is described. The method may comprise determining a first stop location at an intersection; causing the autonomous vehicle to stop at the first stop location; determining a turn path through the intersection; determining a second stop location along the turn path; causing the autonomous vehicle to advance to the second stop location; causing the autonomous vehicle to stop at the second stop location, and causing the autonomous vehicle to continue along the turn path.

DETAILED DESCRIPTION

Described herein are systems and methods for determining a second stop position for an intersection turn (e.g., left turn) by an autonomous vehicle. The vehicle may comprise an autonomous control module for controlling the vehicle autonomously. The autonomous control module may determine to make the left turn at an upcoming intersection. If there is a stop light, stop sign, oncoming traffic, or some other indicator that indicates the vehicle should stop, the autonomous control module may cause the vehicle to stop at a first stopping point. The autonomous control module may determine the first stopping point based upon one or more data sources. The data sources may include, but are not limited to, GPS locators, sensors, remote storage and/or local storage. The autonomous control module may determine a second stopping point for the vehicle. The second stopping point may be a point along the left hand turn. For example, the vehicle may stop at the first stopping point and then when a traffic light turns green for the vehicle, the vehicle may advance to a second stopping position somewhere in the intersection. The second stopping point may be determined based upon a calculated turn path and the location of lane boundaries of oncoming traffic. The second stopping point may be a predetermined distance from a crossing point. The crossing point may be the point where the turn path intersects the closes lane boundary of oncoming traffic. The predetermined distance may be selected for driver comfort. Stopping a predetermined distance away from the crossing point may be more comfortable for a driver than stopping exactly on the crossing point. Stopping a predetermined distance from the crossing point may also allow a margin of error for oncoming traffic. Once traffic has cleared or the traffic signal turns yellow or red, the vehicle may complete the left turn.

For ease of reading, the description will refer to embodiments where a vehicle is making a left intersection turn, which is permitted according to the driving rules in the United States. However, it is noted that other suitable embodiments of the invention include vehicles making right intersection turns such as those permitted according to the driving rules of other countries (e.g., Japan).

Figure 1:
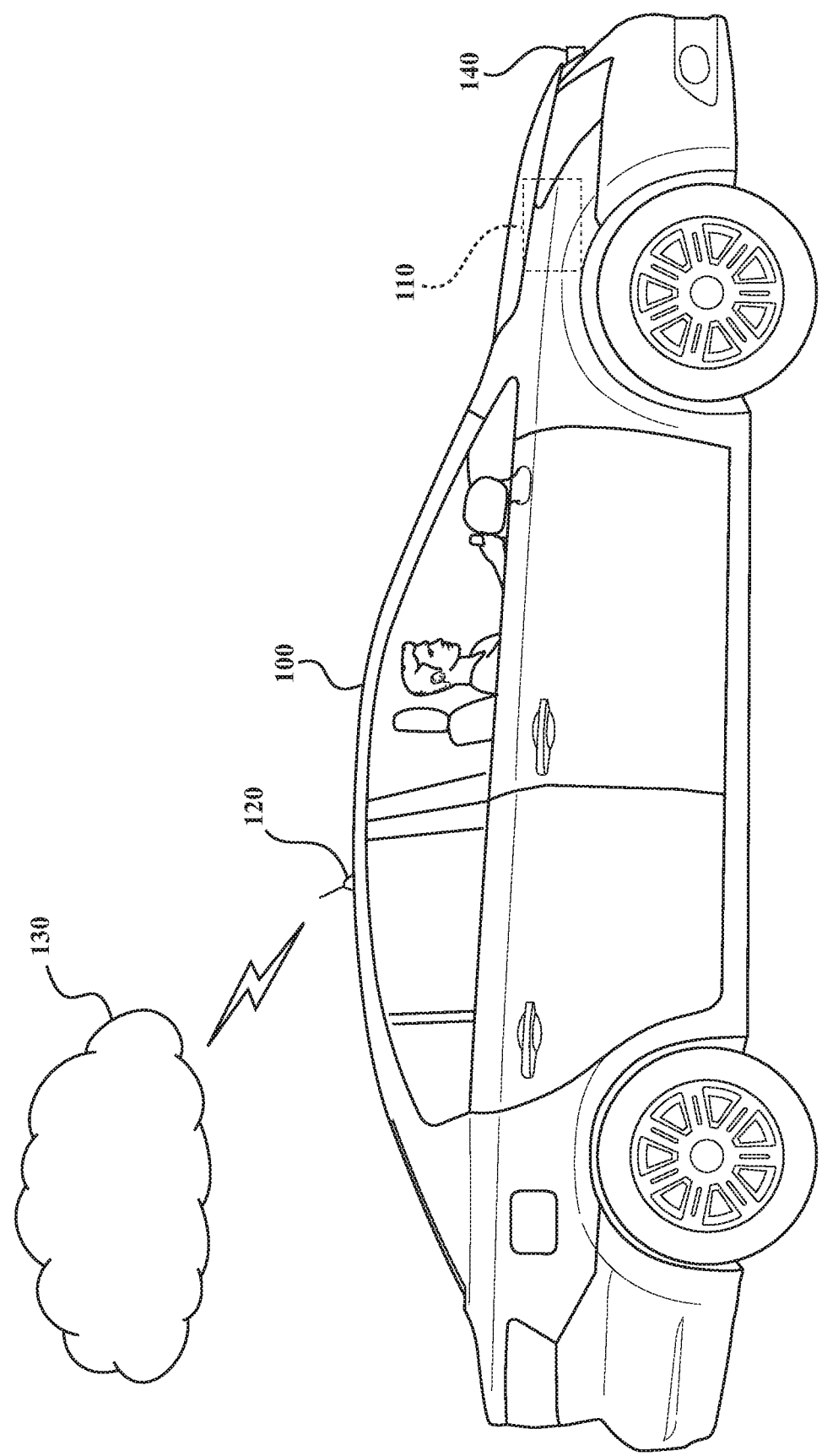
FIG. 1 is a diagram of an embodiment of a vehicle configured for an autonomous second stop position for a left turn.

FIG. 1 is a diagram of an embodiment of a vehicle 100 configured for an autonomous second stop position for a left turn. Vehicle 100 may be any autonomously controlled vehicle. Vehicle 100 may comprise an autonomous control module 110. The autonomous control module 110 may be part of an electronic control unit (ECU) or some other system in the vehicle 100. In other embodiments, autonomous control module 110 may be a standalone module within the vehicle 100. The autonomous control module 110 may be configured to control the movements of the vehicle autonomously. Autonomous control may include partial autonomous control, e.g., collision avoidance, or full autonomous control, e.g., vehicle routing and control.

The autonomous control module 110 may make control decisions based upon data received from sensor 140 and/or retrieved from remote storage 130. Sensor 140 may be a camera, ultrasonic sensor, LiDAR, radar, or some other type of sensor used to gather data about the surroundings of vehicle 100. While one sensor is depicted, in some embodiments more than one sensor may be used and more than one type of sensor may be used. While the sensor is shown on the front of vehicle 100, in some embodiments additional sensors may be installed at various locations on the vehicle. The autonomous control module may transmit and receive data from remote storage 130 via antenna 120. Antenna 120 may be part of a wireless communication system of the vehicle 100. One or more antennas may be present on vehicle 100 at one or more locations. Remote storage 130 may be cloud based storage or some other data storage remote from the vehicle 100. Autonomous control module 110 may retrieve data from the remote storage 130 and make control decisions based upon the retrieved data. For example, maps and other navigational aids may be stored at remote storage 130. Autonomous control module 110 may also have local storage (not pictured) where data may be stored for making control decisions.

In an embodiment, vehicle 100 may be operating autonomously. The autonomous control module 110 may be controlling the movements of vehicle 100. As the vehicle 100 approaches an intersection, the autonomous control module 110 may retrieve data about the intersection. The data about the intersection may be retrieved from any combination of remote storage 130, sensor data from sensor 140, or locally stored data. Autonomous control module 110 may determine based upon a predetermined route, that vehicle 100 will be making a left turn. Using data about the intersection, the vehicle 100 may determine where to stop prior to making a left turn. For example, at a line indicating a crosswalk, aligned with a curb, at a particular coordinate, and/or some other landmark at the intersection. The data about the intersection may include the locations of crosswalks at the intersection, the location of crossing lanes at the intersection, the status of traffic control devices at the intersection, or other information relevant to making a left turn. The autonomous control module 110 may determine a first stopping location for the vehicle 100 if a traffic control indicator, e.g., a traffic light or stop sign, or some other condition indicates that the vehicle 100 should stop. Subsequently, the autonomous control module 110 may determine that the vehicle 100 may proceed with a left turn. The autonomous control module 110 may determine a second stop location for the vehicle 100 based upon crossing lanes and oncoming traffic lanes and/or other factors. The autonomous control module 110 may cause the vehicle 100 to advance to the second stop location. After the autonomous control module 110 determines the vehicle 100 may safely complete the left turn, that autonomous control module 110 may cause the vehicle 100 to complete the left turn. The operation of the autonomous control module 110 is discussed in greater detail with reference to FIGS. 2 and 3.

Figure 2B:
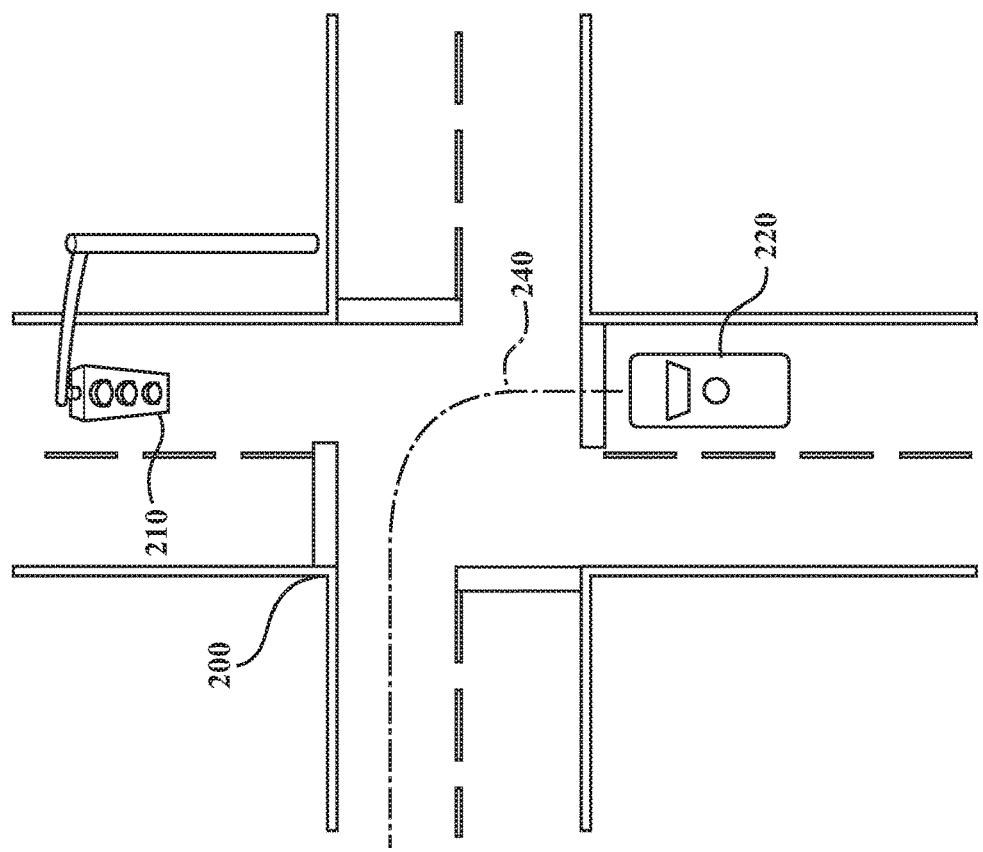
FIG. 2B is a diagram of an embodiment of a turn path.
Figure 2A:
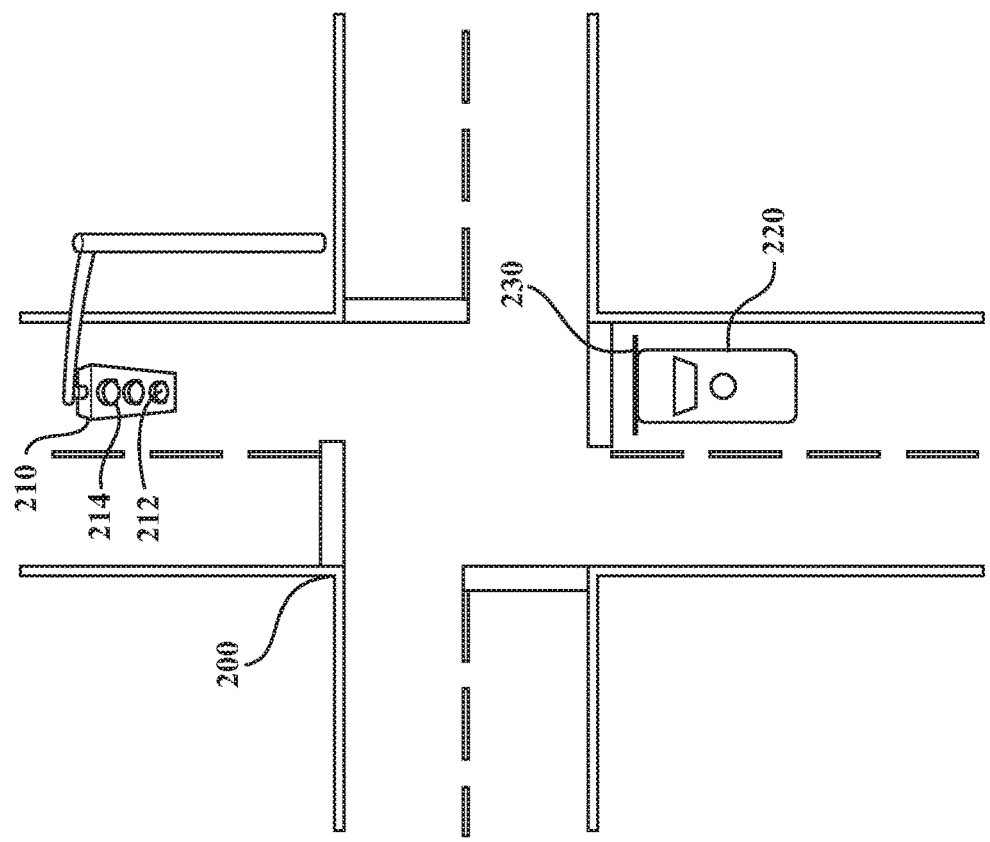
FIG. 2A is a diagram of an embodiment of a vehicle at an intersection.

FIGS. 2A-2H depict an embodiment of an autonomous left turn sequence with a second stop. FIG. 2A is a diagram of a vehicle 220 at an intersection 200. Vehicle 220 may be operating autonomously as it approaches intersection 220. As vehicle 220 approaches intersection 200, an autonomous control module, e.g., autonomous control module 110, may cause the vehicle 220 to stop at location 230. The autonomous control module may stop the vehicle based upon the presence of a traffic control indicator indicating that the vehicle should stop. Traffic light 210 may have a red stop indicator 212. The vehicle 220 may detect that the red stop indicator 212 is illuminated. Vehicle 220 may detect the red stop indicator 212 using a sensor, e.g., sensor 140. In some embodiments, other traffic control indicators may be detected, e.g., a stop sign, yield sign, or some other indication that the vehicle should stop.

FIG. 2B is a diagram of an embodiment of a turn path 240. The autonomous control module may determine that the vehicle 220 should make a left turn at intersection 200. The autonomous control module may make this determination based upon a predetermined route that vehicle 220 is traveling. The autonomous control module may determine to turn left based upon other inputs or calculations, e.g. detecting upcoming traffic congestion on the current road, or an input from the driver of the vehicle. The autonomous control module may calculate a turn path 240. The turn path 240 may be calculated based upon data received by the autonomous control module from one or more sources. The one or more sources may include locally stored data, remotely stored data, data gathered by sensors on the vehicle 220, or other data. The turn path 240 may be calculated to enable the vehicle 220 to make a left turn.

Figure 2D:
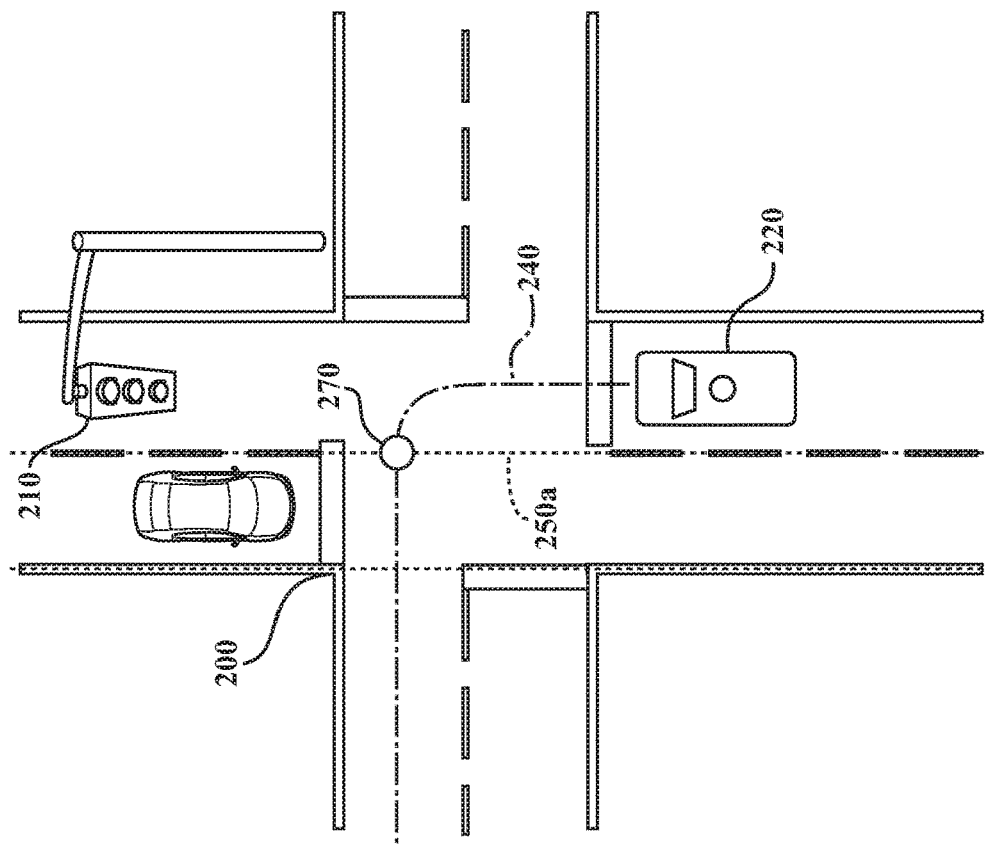
FIG. 2D is a diagram of an embodiment of a crossing point.
Figure 2C:
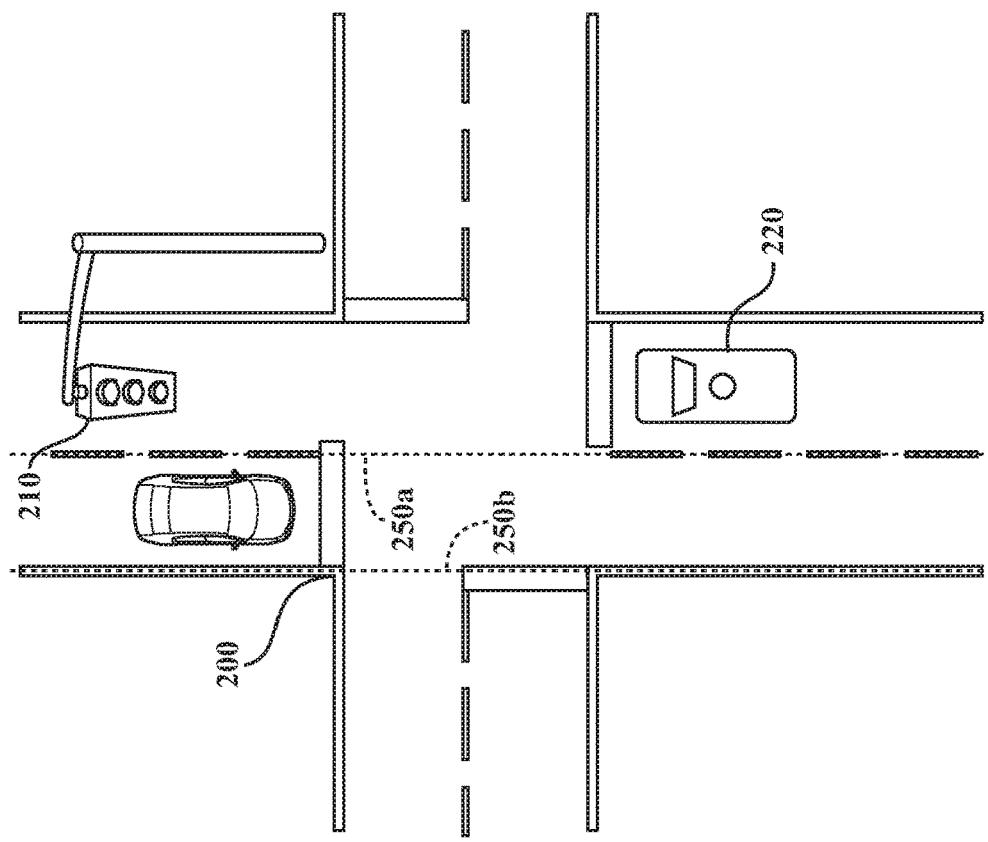
FIG. 2C is a diagram of an embodiment of lane boundaries.

FIG. 2C is a diagram of an embodiment of lane boundaries 250a and 250b. The autonomous control module of vehicle 220 may determine the location of lane boundaries 250a and 250b for the lanes of traffic around vehicle 220. While only two lane boundaries are shown, any number of lane boundaries may be calculated by the autonomous control module. Lane boundaries may be calculated for oncoming traffic lanes, traffic lanes in the same direction, and/or cross traffic lanes. The autonomous control module may calculate the lane boundaries based upon any combination of data received from remote storage, data retrieved from local storage, data received from on-vehicle sensors, and/or data received from other sources.

FIG. 2D is a diagram of an embodiment of a crossing point 270. The autonomous control module of vehicle 220 may determine the location of a crossing point 270. The crossing point 270 may be determined as a point where the turn path 240 intersects the closest lane boundary to the vehicle. In this case, lane boundary 250a is the closest lane boundary to vehicle 220. Thus, crossing point 270 may be determined as the point where turn path 240 intersects lane boundary 250a.

Figure 2E:
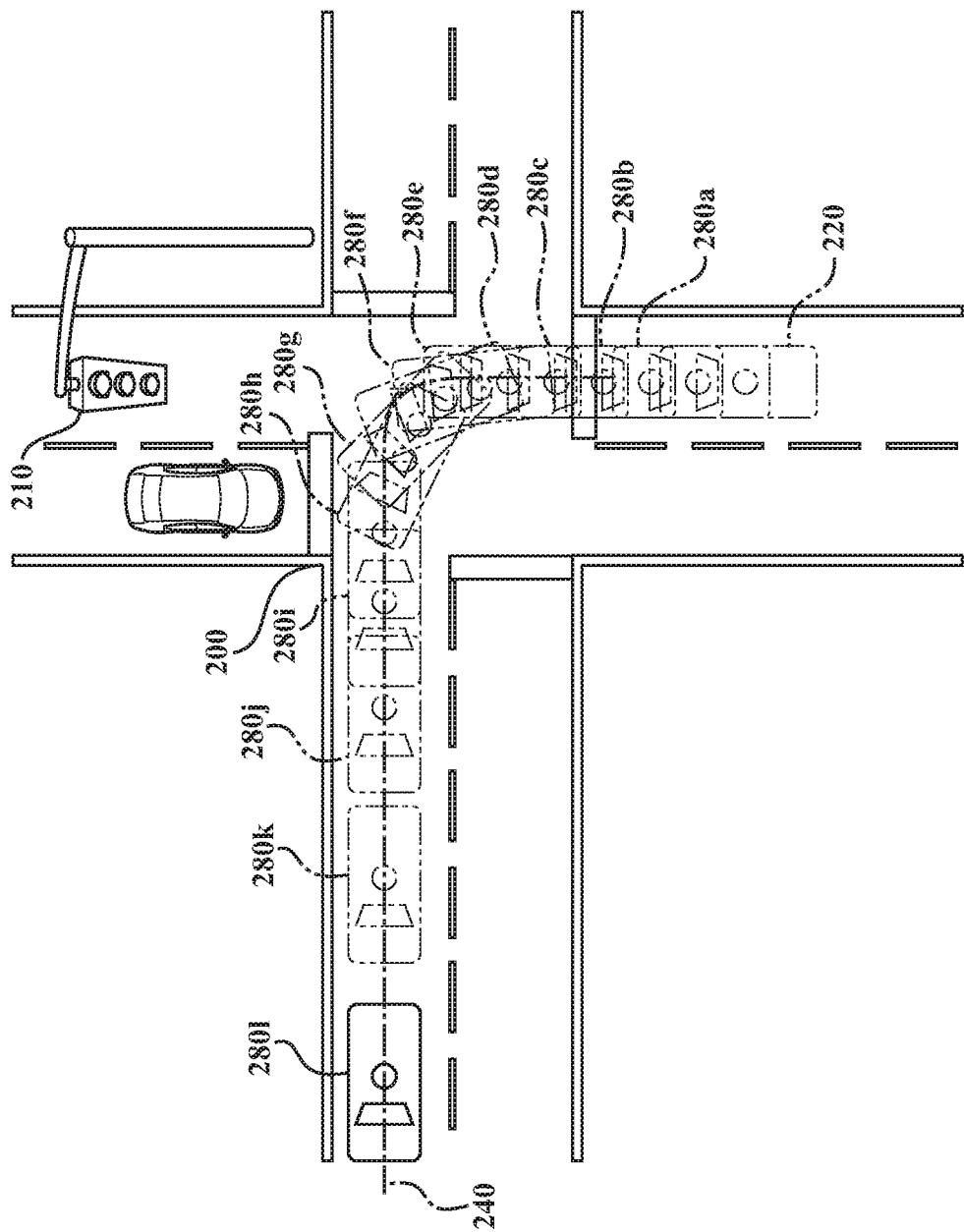
FIG. 2E is a diagram of an embodiment of an autonomous vehicle trajectory.

FIG. 2E is a diagram of an embodiment of an autonomous vehicle trajectory. Positions 280a-1 may represent the position of vehicle 220 as it completes a left turn along path 240. Each position 280 a-l may represent a location of the vehicle along a trajectory at a specific time during the completion of the left turn. The autonomous control module of vehicle 220 may determine the location of positions 280a-l based on the turn path 240 and/or characteristics of vehicle 220, e.g., turning radius, acceleration, etc.

Figure 2F:
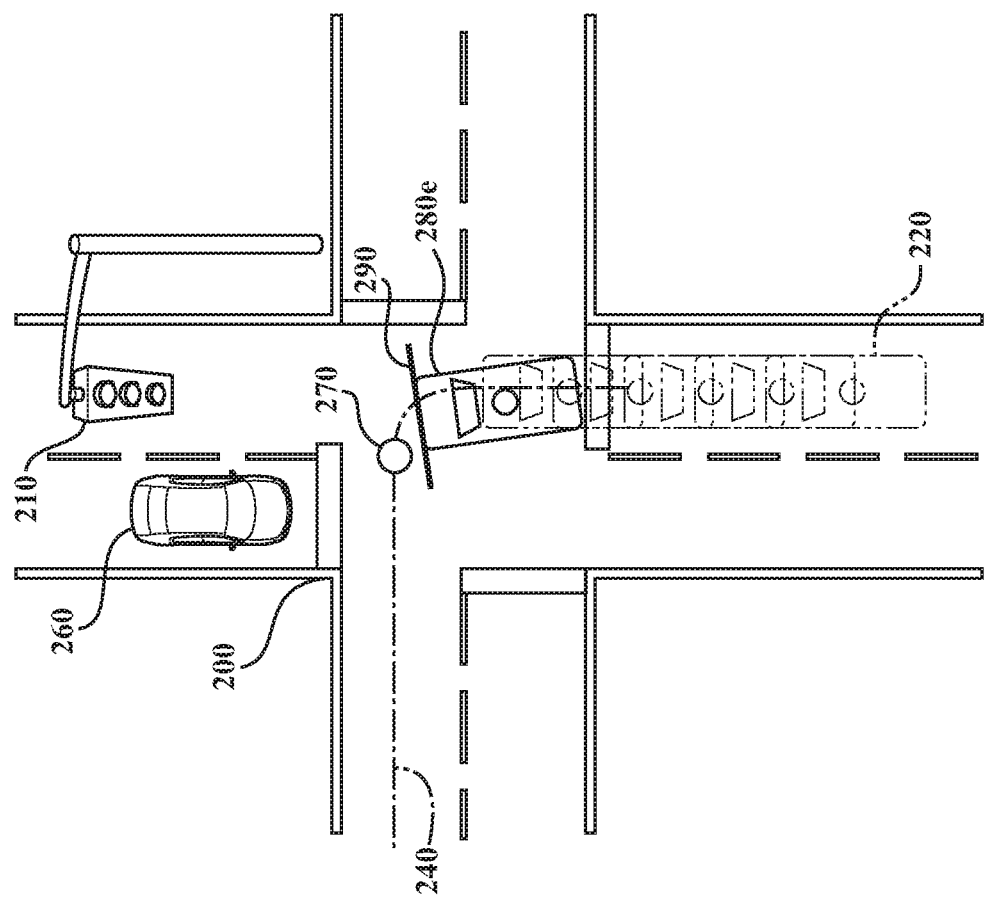
FIG. 2F is a diagram of an embodiment of a second stop location.

FIG. 2F is a diagram of an embodiment of a second stop location 290. The second stop location 290 may be determined by the autonomous control module. The second stop location 290 may be determined based upon the crossing point 270 and one of positions 280a-1. The autonomous control module may select the second stop location 290 using a predetermined distance from crossing point 270. The predetermined distance may be selected based upon the size of the vehicle 220 or other factors such as driver comfort. The autonomous control module may determine the vehicle should stop at position 280e in order to stop at second stop location 290.

Figure 2H:
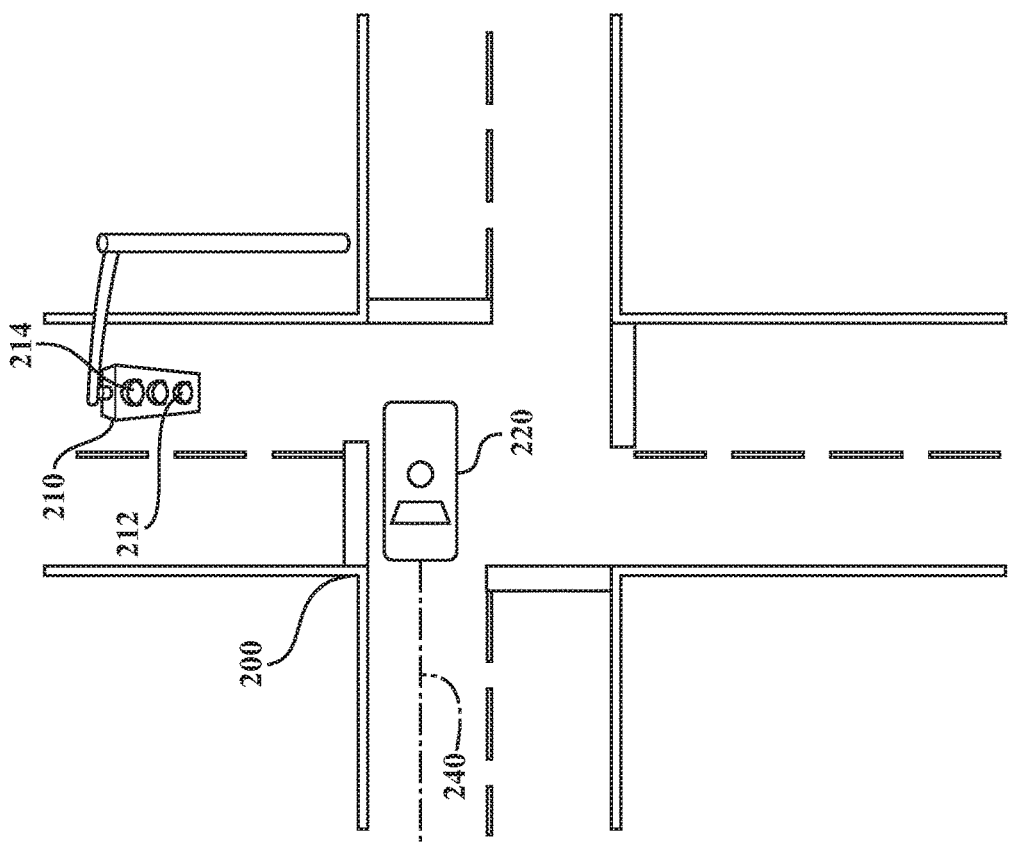
FIG. 2H is a diagram of an embodiment of a vehicle completing a left turn.
Figure 2G:
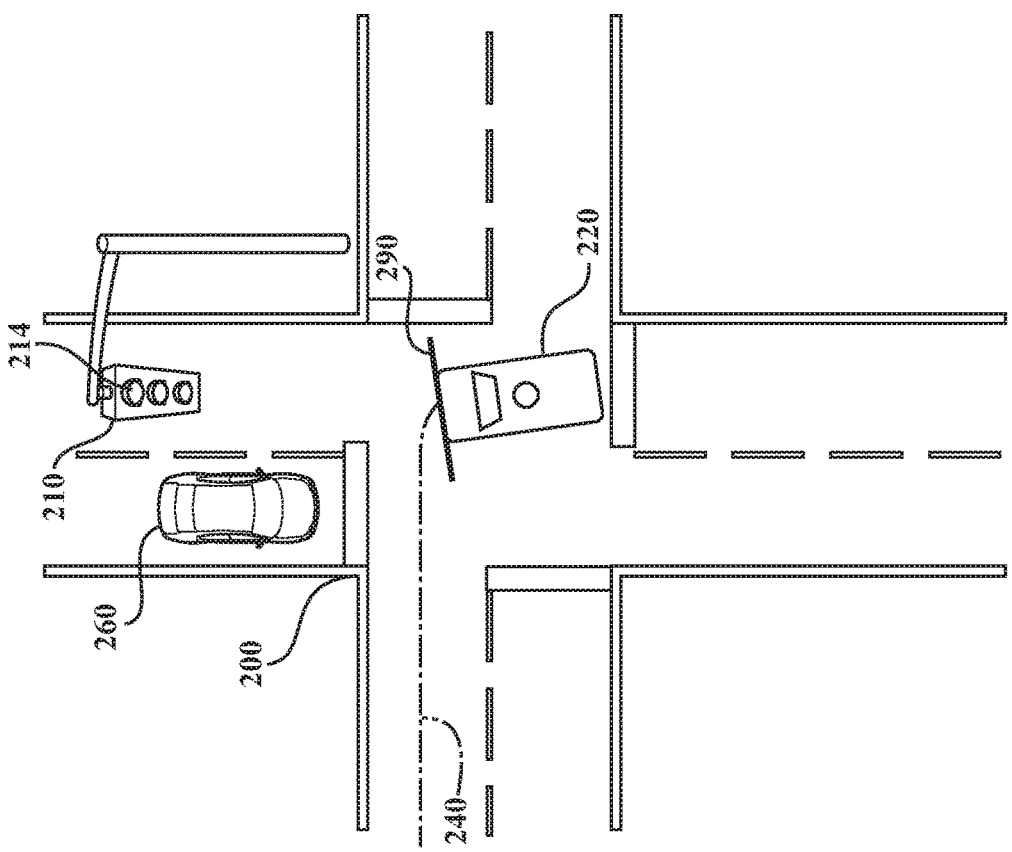
FIG. 2G is a diagram of an embodiment of a vehicle at a second stop location.

FIG. 2G is a diagram of an embodiment of a vehicle 220 at a second stop location 290. When traffic signal 210 illuminates the green indicator 214, the autonomous control module may control the vehicle 220 and cause the vehicle 222 advance to the second stop location 290. An oncoming vehicle 260 may be detected. The autonomous control module may cause the vehicle 220 to wait at the second stop location 290 until the oncoming vehicle 260 passes.

FIG. 2H is a diagram of an embodiment of a vehicle 220 completing a left turn. When there is no more oncoming traffic, or if traffic indicator 214 changes from a green indicator 214 to a red indicator 212 while vehicle 220 is at the second stop position 290, the autonomous control module may cause vehicle 222 complete the left turn.

Figure 3:
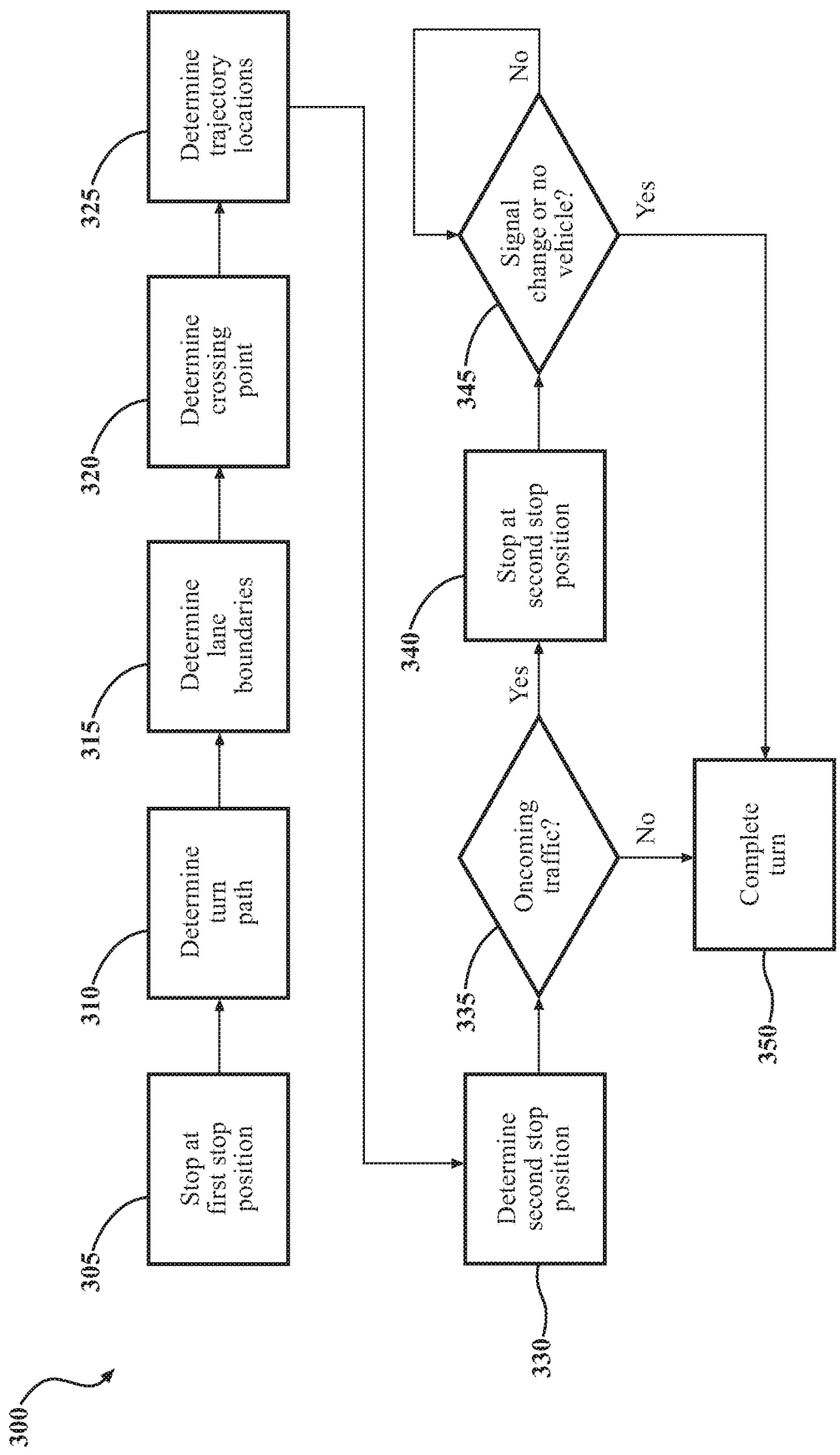
FIG. 3 is a flow diagram of an embodiment of a method for determining a second stop position.

FIG. 3 is a flow diagram of an embodiment of a method 300 for determining a second stop position. The method may begin at block 305 when a vehicle stops at a first stop position. The vehicle may stop based upon one or more factors. The factors may include but are not limited to: a traffic control signal, signage, oncoming traffic, or some other condition that would require the vehicle to stop. The first stop position may be determined using one or more of the following: a sensor detecting lines on pavement indicating a stop position, a sensor detecting a curb location, a sensor detecting crosswalk, GPS location coordinated with data stored locally or remotely, a command received by an autonomous control module from a remote location or from the vehicle, or some other source of data related to the first stop position.

At block 310 the autonomous control module may determine a turn path for the vehicle. The turn path may be a route through an intersection that would complete a left turn for the vehicle. The autonomous control module may consider a number of factors when determining a turn path. These factors may include but are not limited to: number of lanes of oncoming traffic, number of lanes in crossing traffic, vehicle characteristics, or other factors that may influence a left turn completed by the vehicle. In some embodiments, the turn path may be calculated at a remote location and transmitted to the autonomous control module. In some embodiments, the autonomous control module may calculate the turn path locally.

At block 315 the autonomous control module may determine lane boundaries. The lane boundaries may be the location of the outer edges of oncoming traffic lanes, crossing traffic lanes, and/or parallel traffic lanes. The lane boundaries may be determined for some or all of the lanes at an intersection where a left turn may be completed. At block 320 the autonomous control module may determine a crossing point. The crossing point may be a point where the path determined in block 310 crosses a lane boundary determined in block 315.

At block 325 the autonomous control module may determine a trajectory comprising the discrete locations of the vehicle as it completes a left turn along the path determined in block 310. The path determined in block 310 may be a line with coordinates that may be followed to complete the turn. The trajectory determined in block 325 may include the actual width of the vehicle and location within a lane and/or within an intersection.

At block 330 the autonomous control module may determine a location for the second stop position. The second stop position may be determined based upon the lane boundaries determined at block 315, the crossing point determined at block 320, and/or the trajectory locations determined at block 325. In an embodiment, the second stop position may be at a point a predetermined distance from the crossing point determined at block 320.

At block 335 the autonomous control module may determine if there is oncoming traffic approaching. If no oncoming traffic is approaching, the autonomous control module may cause the vehicle to complete the turn at block 350. If there is approaching oncoming traffic, the autonomous control module may cause the vehicle to advance to the second stop position at block 340. At block 345 the autonomous control module may monitor traffic conditions and/or the state of a traffic control signal. When there is no longer any oncoming traffic, the autonomous control module may cause the vehicle to complete its left turn. If the signal should change to a yellow or red signal, and traffic is clear, the vehicle may then complete its left turn at block 350.

Figure 4:
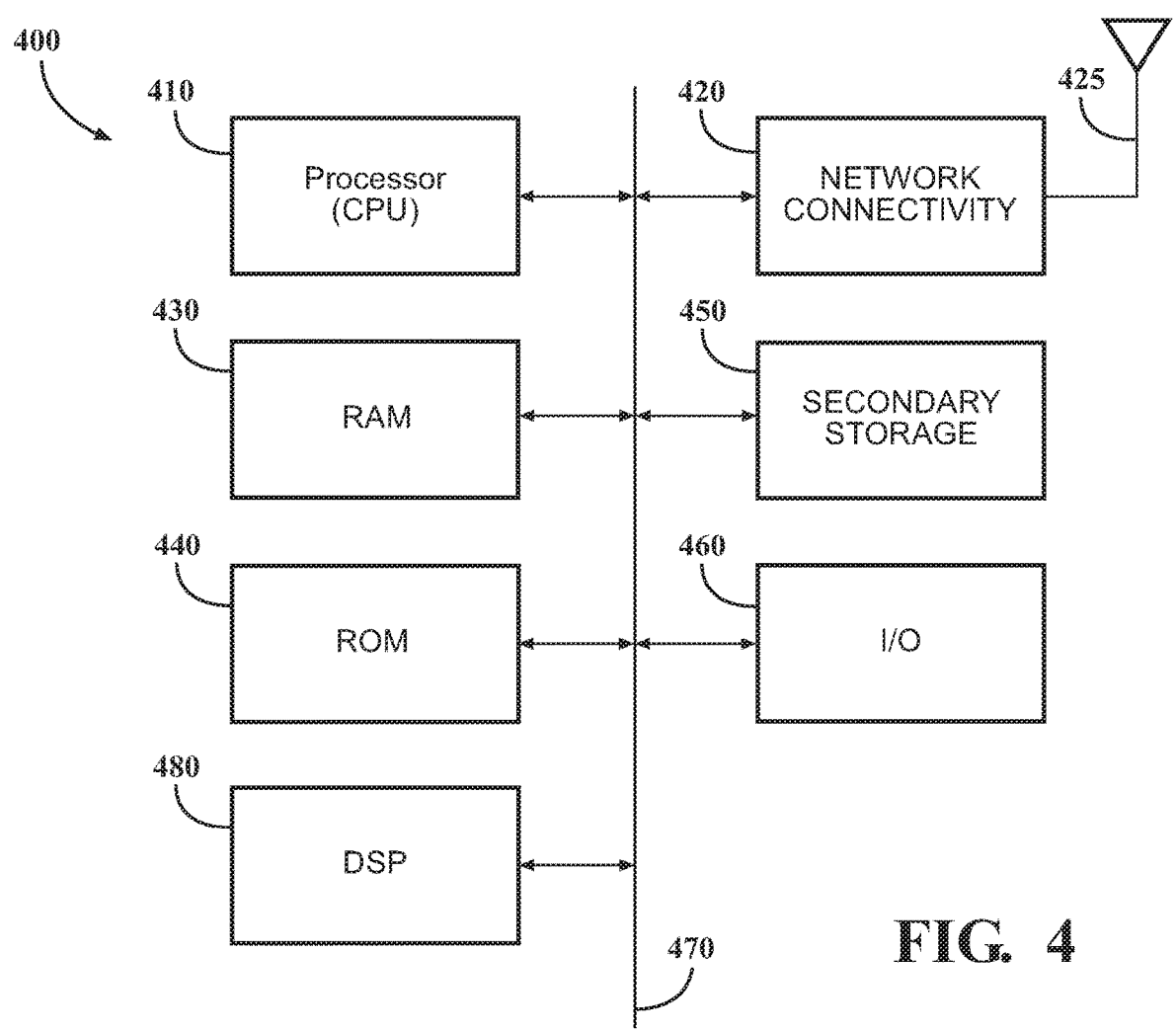
FIG. 4 is a diagram of an embodiment of a system for determining a second stop position for a left turn.

FIG. 4 is a diagram of an embodiment of a system 400 that includes a processor 410 suitable for implementing one or more embodiments disclosed herein, e.g. an autonomous control module. The processor 410 may control the overall operation of the system.

In addition to the processor 410 (which may be referred to as a central processor unit or CPU), the system 400 might include network connectivity devices 420, random access memory (RAM) 430, read only memory (ROM) 440, secondary storage 450, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 480. Although the DSP 480 is shown as a separate component, the DSP 480 might be incorporated into the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, or optical disk). While only one CPU 410 is shown, multiple processors may be present. Thus, while instructions may be discussed as being executed by a processor, the instructions may be executed simultaneously, serially, or otherwise by one or multiple processors. The processor 410 may be implemented as one or more CPU chips and may be a hardware device capable of executing computer instructions.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, controller area network (CAN), domestic digital bus (D2B), and/or other well-known devices for connecting to networks. These network connectivity devices 420 may enable the processor 410 to communicate with the Internet or one or more telecommunications networks or other networks from which the processor 410 might receive information or to which the processor 410 might output information. The network connectivity devices 420 might also include one or more transceiver components 425 capable of transmitting and/or receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 may be used to store programs that are loaded into RAM 430 when such programs are selected for execution.

The I/O devices 460 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 425 might be considered to be a component of the I/O devices 460 instead of or in addition to being a component of the network connectivity devices 420.

Detailed embodiments are disclosed herein, however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

It will be understood by one having ordinary skill in the art that construction of the described invention and other components is not limited to any specific material. Other exemplary embodiments of the invention disclosed herein may be formed from a wide variety of materials, unless described otherwise herein.

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. An autonomous control module comprising:
a memory; and
a processor coupled to the memory, the processor configured to
determine a first stop location at an intersection;
cause a vehicle to stop at the first stop location;
determine a turn path through the intersection;
determine a lane boundary;
determine a crossing point based, at least in part, on where the turn path crosses the lane boundary;
determine a second stop location along the turn path a predetermined distance from the crossing point;
cause the vehicle to advance to the second stop location;
cause the vehicle to stop at the second stop location; and
cause the vehicle to continue along the turn path.

2. The autonomous control module of claim 1, wherein the processor configured to determine the first stop location comprises the processor configured to determine the presence of a traffic control device indicating a stop indicator.

3. The autonomous control module of claim 1, wherein the processor configured to cause the vehicle to continue along the turn path comprises the processor configured to:
determine an absence of oncoming traffic.

4. The autonomous control module of claim 2, wherein the processor configured to cause the vehicle to continue along the turn path comprises the processor configured to:
determine a change in an indication of the traffic control device.

5. A vehicle comprising:
one or more sensors;
a wireless communication system; and
an autonomous control module coupled to the one or more sensors and the wireless communication system, the autonomous control module configured to:
determine a first stop location at an intersection;
cause the vehicle to stop at the first stop location;
determine a turn path through the intersection;
determine a lane boundary;
determine a crossing point based, at least in part, on where the turn path crosses the lane boundary;
determine a second stop location along the turn path a predetermined distance from the crossing point;
cause the vehicle to advance to the second stop location;
cause the vehicle to stop at the second stop location; and
cause the vehicle to continue along the turn path.

6. The vehicle of claim 5, wherein the autonomous control module configured to determine the first stop location comprises the autonomous control module configured to determine the presence of a traffic control device indicating a stop indicator based upon data received from the one or more sensors.

7. The vehicle of claim 5, wherein the autonomous control module configured to cause the vehicle to continue along the turn path comprises the autonomous control module configured to:
determine an absence of oncoming traffic based upon data received from the one or more sensors.

8. The vehicle of claim 6, wherein the autonomous control module configured to cause the vehicle to continue along the turn path comprises the autonomous control module configured to:
determine a change in an indication of the traffic control device based upon data received from the one or more sensors.

9. A method for an autonomous intersection turn in an autonomous vehicle, the method comprising:
determining a first stop location at an intersection;
causing the autonomous vehicle to stop at the first stop location;
determining a turn path through the intersection;
determining a lane boundary;
determining a crossing point based, at least in part, on where the turn path crosses the lane boundary;
determining a second stop location along the turn path a predetermined distance from the crossing point;
causing the autonomous vehicle to advance to the second stop location;
causing the autonomous vehicle to stop at the second stop location; and
causing the autonomous vehicle to continue along the turn path.

10. The method of claim 9, wherein determining the first stop location comprises determining the presence of a traffic control device indicating a stop indicator.

11. The method of claim 9, wherein causing the vehicle to continue along the turn path comprises determining an absence of oncoming traffic.

12. The method of claim 10, wherein causing the vehicle to continue along the turn path comprises determining a change in an indication of the traffic control device.

* * * * *